United States Patent
Medina et al.

(10) Patent No.: US 6,678,278 B2
(45) Date of Patent: Jan. 13, 2004

(54) BIT CLEARING MECHANISM FOR AN EMPTY LIST

(75) Inventors: Eitan Medina, Tel Aviv (IL); Rami Rozenzveig, Kiryat Motzkin (IL); David Shemla, Kfar Havradim (IL)

(73) Assignee: Marvell Semiconductor Israel Ltd., Misgav (IL)

( * ) Notice: Subject to any disclaimer, the term of this patent is extended or adjusted under 35 U.S.C. 154(b) by 339 days.

(21) Appl. No.: 09/861,649

(22) Filed: May 22, 2001

(65) Prior Publication Data

US 2002/0009094 A1 Jan. 24, 2002

Related U.S. Application Data

(63) Continuation of application No. 09/129,444, filed on Jul. 30, 1998, now Pat. No. 6,240,065, which is a continuation-in-part of application No. 08/779,063, filed on Jan. 7, 1997, now Pat. No. 5,913,042.

(30) Foreign Application Priority Data

Jan. 8, 1996 (IL) .................................................. 116707

(51) Int. Cl.⁷ .......................... G06F 15/16; H04L 12/54
(52) U.S. Cl. ....................... 370/412; 370/235; 370/429; 709/234
(58) Field of Search ............................. 370/229, 230.1, 370/235, 368, 371, 389, 412, 413, 415, 416, 418, 428, 429; 709/234; 711/170, 171, 173

(56) References Cited

U.S. PATENT DOCUMENTS

| | | | |
|---|---|---|---|
| 4,464,713 A | 8/1984 | Benhase et al. ............ 364/200 |
| 4,663,706 A | * 5/1987 | Allen et al. ................. 709/234 |
| 4,992,935 A | 2/1991 | Comerford et al. ......... 364/200 |
| 4,996,663 A | 2/1991 | Nemes ....................... 364/900 |
| 5,032,987 A | 7/1991 | Broder et al. ............... 364/200 |
| 5,043,981 A | * 8/1991 | Firoozmand et al. ....... 370/235 |
| 5,101,348 A | 3/1992 | Arrowood et al. .......... 395/200 |
| 5,129,085 A | 7/1992 | Yamasaki ................... 395/650 |
| 5,222,064 A | 6/1993 | Sagawa ................... 370/85.13 |
| 5,241,536 A | 8/1993 | Grimble et al. ............ 370/60.1 |
| 5,274,631 A | 12/1993 | Bhardwaj .................... 370/60 |
| 5,287,499 A | 2/1994 | Nemes ....................... 395/600 |
| 5,412,805 A | 5/1995 | Jordan, II et al. .......... 395/600 |
| 5,440,552 A | 8/1995 | Sugita ......................... 370/60 |
| 5,521,913 A | 5/1996 | Gridley .................... 370/58.2 |

(List continued on next page.)

OTHER PUBLICATIONS

Dr. Dobb's Journal, "Essential Books on Algorithms and Data Structures", CD–ROM Library, Section 9.3.1 and 9.3.4, 1995.

Ralston and Reilly, Encyclopedia of Computer Science (Third Edition), pp. 1185–1191, 1995.

Tanenbaum, A.S. ed. "File Systems," Chapter 5 In *Operating Systems: Design and Implementation*. Prentice–Hall International, Inc., Englewood Cliffs, NJ, 1987, pp. 302–304.

*Primary Examiner*—Hassan Kizou
*Assistant Examiner*—Afsar M. Qureshi (57) ABSTRACT

A method and apparatus for managing packet memory is provided. The apparatus includes an empty list, a storage buffer and apparatus for updating the storage buffer and empty list. The empty list includes a multiplicity of single bit buffers. The storage buffer includes a multiplicity of contiguous buffers, wherein each single bit buffer is associated with one of the contiguous buffers. The state of the bit of a single bit buffer indicates the empty or full state of the associated contiguous buffer and the address of a contiguous buffer is a simple function of the address or number of its associated single bit buffer. The updating apparatus stores data in and removes data from the contiguous buffers and correspondingly updates the states of the associated single bits buffers.

14 Claims, 4 Drawing Sheets

U.S. PATENT DOCUMENTS

| | | | |
|---|---|---|---|
| 5,574,944 A | * 11/1996 | Stager | 710/5 |
| 5,581,757 A | 12/1996 | Maxey | 395/610 |
| 5,632,021 A | 5/1997 | Jennings et al. | 395/309 |
| 5,633,858 A | 5/1997 | Chang et al. | 370/255 |
| 5,634,138 A | 5/1997 | Ananthan et al. | 395/841 |
| 5,649,141 A | 7/1997 | Yamazaki | 395/416 |
| 5,668,809 A | * 9/1997 | Rostoker et al. | 370/392 |
| 5,671,357 A | 9/1997 | Humblet et al. | 395/200.11 |
| 5,715,395 A | 2/1998 | Brabson et al. | 395/200.13 |
| 5,724,529 A | 3/1998 | Smith et al. | 395/309 |
| 5,734,824 A | 3/1998 | Choi | 395/200.11 |
| 5,740,468 A | * 4/1998 | Hirose | 710/57 |
| 5,754,791 A | 5/1998 | Dahlgren et al. | 395/200.72 |
| 5,761,431 A | 6/1998 | Gross et al. | 395/200.55 |
| 5,764,996 A | 6/1998 | Armstrong et al. | 395/733 |
| 5,781,549 A | 7/1998 | Dai | 370/398 |
| 5,784,373 A | 7/1998 | Satake et al. | 370/402 |
| 5,913,042 A | 6/1999 | Shemla et al. | 395/200.64 |
| 5,923,660 A | 7/1999 | Shemla et al. | 370/402 |
| 6,240,065 B1 | 5/2001 | Medina et al. | 370/229 |

* cited by examiner

BIT CLEARING MECHANISM FOR AN EMPTY LIST

This application is a continuation of Ser. No. 09/129,444, entitled "Method And Apparatus For Managing Packet Memory", filed Jul. 30, 1998, now U.S. Pat. No. 6,240,065, which is a continuation-in-part of Ser. No. 08/779,063, entitled "Method and Apparatus for Managing Packet Memory", filed Jan. 7, 1997, now U.S. Pat. No. 5,913,042, each of which are incorporated herein by reference.

FIELD OF THE INVENTION

The present invention relates to network switches generally and to their apparatus for managing packet memory in particular.

BACKGROUND OF THE INVENTION

A network switch creates a network among a plurality of end nodes, such as workstations, and other network switches connected thereto. Each end node is connected to one port of the network. The ports also serve to connect network switches together.

Each end node sends packets of data to the network switch which the switch then routes either to another of the end nodes connected thereto or to a network switch to which the destination end node is connected. In the latter case, the receiving network switch routes the packet to the destination end node.

Each network switch has to temporarily store the packets of data which it receives from the units (end node or network switch) connected to it while the switch determines how, when and through which port to retransmit the packets. Each packet can be transmitted to only one destination address (a "unicast" packet) or to more than one unit (a "multicast" or "broadcast" packet). For multicast and broadcast packets, the switch typically stores the packet only once and transmits multiple copies of the packet to some (multicast) or all (broadcast) of its ports. Once the packet has been transmitted to all of its destinations, it can be removed from the memory or written over.

It is common that some ports are more active than others. Thus, some ports receive most of the packets while other ports receive few of the packets. Therefore, the busier ports have longer backlogs than the other ports. To effectively operate, the network switch must actively manage the memory in which the packets are stored, noting which packets are to be shipped to which ports and which portions of memory are currently available. One common method for managing the memory is to provide a fixed buffer per port.

SUMMARY OF THE PRESENT INVENTION

It is an object of the present invention to provide improved apparatus and method for managing the memory in which the incoming packets are stored.

There is therefore provided, in accordance with a preferred embodiment of the present invention, apparatus including an empty list, a storage buffer and apparatus for updating the storage buffer and empty list. The empty list includes a multiplicity of single bit buffers. The storage buffer includes a multiplicity of contiguous buffers, wherein each single bit buffer is associated with one of the contiguous buffers. The state of the bit of a single bit buffer indicates the empty or full state of the associated contiguous buffer and the address of a contiguous buffer is a simple function of the address or number of its associated single bit buffer.

The updating apparatus stores data in and removes data from the contiguous buffers and correspondingly updates the states of the associated single bits buffers.

The method of the present invention associates the empty list with the storage buffer such that the address of each contiguous buffer is a simple function of the address or number of its associated single bit buffer and the state of the bit of a single bit buffer indicates the empty or fill state of the associated contiguous buffer. The method also stores data in and removes data from the contiguous buffers and correspondingly updates the states of the associated single bits buffers.

Additionally, in accordance with a preferred embodiment of the present invention, the contiguous buffers are large enough to store at least a packet of data. The contiguous buffers also can store multicast bits which, when set, indicate through which port the data stored in the contiguous buffer has to be transmitted.

Finally, in accordance with a preferred embodiment of the present invention, the memory management unit includes a bit clearing unit which considers a group of single bit buffers at a time. Per group of buffers, the bit clearing unit determines if any bits stored in the group of single bit buffers remain set during a predetermined length period T (the set state of a single bit indicates the full state of the associated contiguous buffer). Alternatively, the bit clearing unit keeps a running sum of the number of single bit buffers that remained set during period T, and compares the running sum to a predetermined threshold of maximum allowed set single bit buffers.

BRIEF DESCRIPTION OF THE DRAWINGS

The present invention will be understood and appreciated more fully from the following detailed description taken in conjunction with the drawings in which.

DETAILED DESCRIPTION OF THE PRESENT INVENTION

Figure 1:
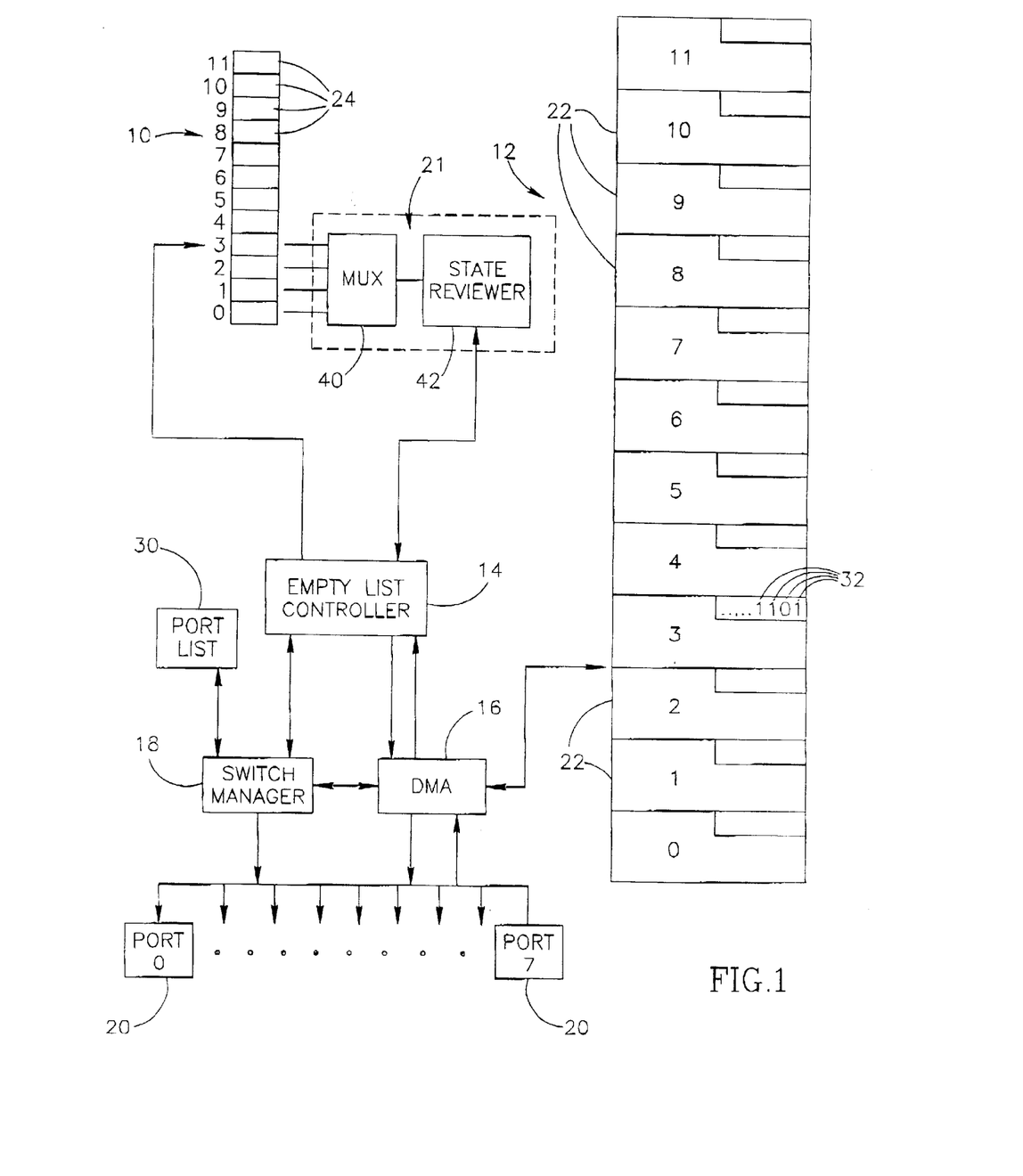
FIG. 1 is a schematic illustration of a memory management apparatus, constructed and operative in accordance with a preferred embodiment of the present invention.

Reference is now made to FIG. 1 which schematically illustrates the memory management apparatus of the present invention. The apparatus comprises an empty list 10 and its associated multiple buffer 12, an empty list controller 14, a direct memory access (DMA) controller 16 and a switch manager 18. FIG. 1 also shows the ports 20 to and from which the packets of data pass and a bit clearing mechanism 21.

In accordance with the present invention, the buffer 12 comprises a multiplicity of contiguous buffers 22, each of M bits and large enough to store, for example, at least one packet of 1518 bytes. For example, M might be 1.5 K or 1536 bytes. Alternatively, each buffer 22 might hold many packets.

Furthermore, in accordance with a preferred embodiment of the present invention, the empty list 10 is a buffer of single (0 or 1) bits 24, each associated with one of the buffers 22. FIG. 1 shows 12 of each of buffers 22 and single bit buffers 24; typically, there will be 1024 or more of each of buffers 22 and single bit buffers 24.

Buffers 24 store the value of 1 when their associated buffer 22 stores a not-yet retransmitted packet and a 0 when their associated buffer 22 is free to be written into. The buffers 22 and bits 24 are associated as follows; the address of the beginning of a buffer 22 is M times the address (or number) of the single bit buffer 24 associated therewith. In other words, for M=1.5 K, the buffer 22 labeled 3 begins at address 4.5 K and the buffer 22 labeled 0 begins at address 0. Alternatively, the first buffer 22 can begin at an offset K and thus, the address of the beginning of a buffer i is M times the address of the single bit buffer 24 associated therewith plus the offset K.

The memory management apparatus operates as follows: when a port 20 provides a packet, the DMA controller 16 requests the number of the next available buffer 22 from the empty list controller 14. Empty list controller 14 reviews the empty list 10 for the next available single bit buffer 24 whose bit has a 0 value. Empty list controller 14 then changes the bit value to 1, multiplies the address of next available buffer 24 by M (and adds an offset K if there is one) and provides the resultant address, which is the start location of the corresponding buffer 22, to DMA controller 16.

It will be appreciated that the present invention provides a very simple mechanism by which to determine and store the address of the next available buffer 22. The mechanism only requires one multiplication operation to determine the address and the address value is stored as a single bit (the value of buffer 24), rather than as a multiple bit address.

DMA controller 16 then enters the data from the incoming packet into the selected buffer 22. Once DMA controller 16 has finished entering the data, it indicates such to the switch manager 18 and also provides switch manager 18 with the destination and source end node addresses so that switch manager 18 can determine through which port to retransmit the packet. Empty list controller 14 provides the switch manager 18 with the number of the buffer 22 in which the packet is stored. Switch manager 18 can be any suitable switch manager, operating in accordance with any suitable principles of switch management. Relevant to the present invention is its control of the empty list and DMA controllers 14 and 16, respectively. To do so, switch manager 18 typically manages a list 30 of the single bit buffers 24 and the output ports through which the packets stored therein are to be retransmitted.

When switch manager 18 determines that a packet is to be retransmitted, manager 18 connects the relevant port 20 to the DMA controller 16 and indicates the port number to the DMA controller 16, multiplies the single bit buffer number associated with that packet (and adds the offset, if there is one) and provides DMA controller 16 with the resultant address of the buffer 22 in which the packet is stored. DMA controller 16 reads the data from the buffer 22 and provides the packet to the connected port 20.

For unicast packets, once the DMA controller 16 has finished transmitting the data of the selected buffer 22, DMA controller 16 indicates such to empty list controller 14 and includes in the indication the beginning address of the selected buffer 22. Empty list controller 14 then determines the buffer number of the selected buffer 22 and changes the bit value of the associated single bit buffer 24 to 0, thereby indicating that the selected buffer 22 is now available.

Buffers 22 are larger by at least N bits than the maximum amount of data to be stored therein. N is the number of ports connected to the switch plus the number of switches connected to the current switch. For example, N might be 46. The extra bits, labeled 32, are utilized, for multicast packets, to indicate the multiple ports through which the packet has to be transmitted.

When the multicast packet enters the switch, DMA controller 16 sets all of the bits 32 (since multicast packets are to be sent to everyone). After the DMA controller 16 has transmitted a packet, whose port number it receives from the switch manager 18, the DMA controller 16 indicates such to the empty list controller 14. If the packet is a multicast packet, the switch manager 18 indicates to the empty list controller 14 to read the N bits 32 to determine if any of them are set. If they are, empty list controller 14 indicates to DMA controller 16 to reset the bit associated with the port 20 through which the packet was sent. When the DMA controller 16 indicates that it has finished resetting the bit, the empty list controller 14 does not change the associated single bit buffer 24.

If the empty list controller 14 reads that only one bit is still set (i.e. the previous transmission was the last time the packet had to be transmitted), when the DMA controller 16 indicates that it has finished resetting the bit, the empty list controller 14 changes the bit value of the associated single bit buffer 24 to 0, thereby indicating that the associated buffer 22 is now available.

In the empty list 10, bits typically change as data is received and transmitted. However, it is possible for data not to be transmitted if there are some errors in the network, such as a port being broken or a switch being removed from the network. In any of these cases, the bits in the empty list 10 associated with those ports must be cleared or else the associated buffers 22 will never be rewritten.

Therefore, the present invention includes bit clearing mechanism 21 which reviews the activity of the bits in the single bit buffers 24 and clears any set bits (i.e. of value 1) which have not changed during a predetermined period T. The period T is typically set to be small enough to avoid wasting storage space for too long but large enough to avoid clearing a buffer before its turn for transmission has occurred.

Bit clearing mechanism 21 comprises a multiplexer 40 and a state reviewer 42. The multiplexer 40 connects, at one time, to a group of single bit buffers 24 and switches between groups of buffers every period T. State reviewer 42 reviews the state of the group of single bit buffers 24 to determine if all of the single bit buffers 24 changed from 1 to 0 at least once during the period T. If, at the end of period T, one or more bits in buffers 24 have remained in the set state (i.e. with value 1), the state reviewer 42 clears them to 0. Multiplexer 40 then connects to the next group of single bit buffers 24.

Figure 2:
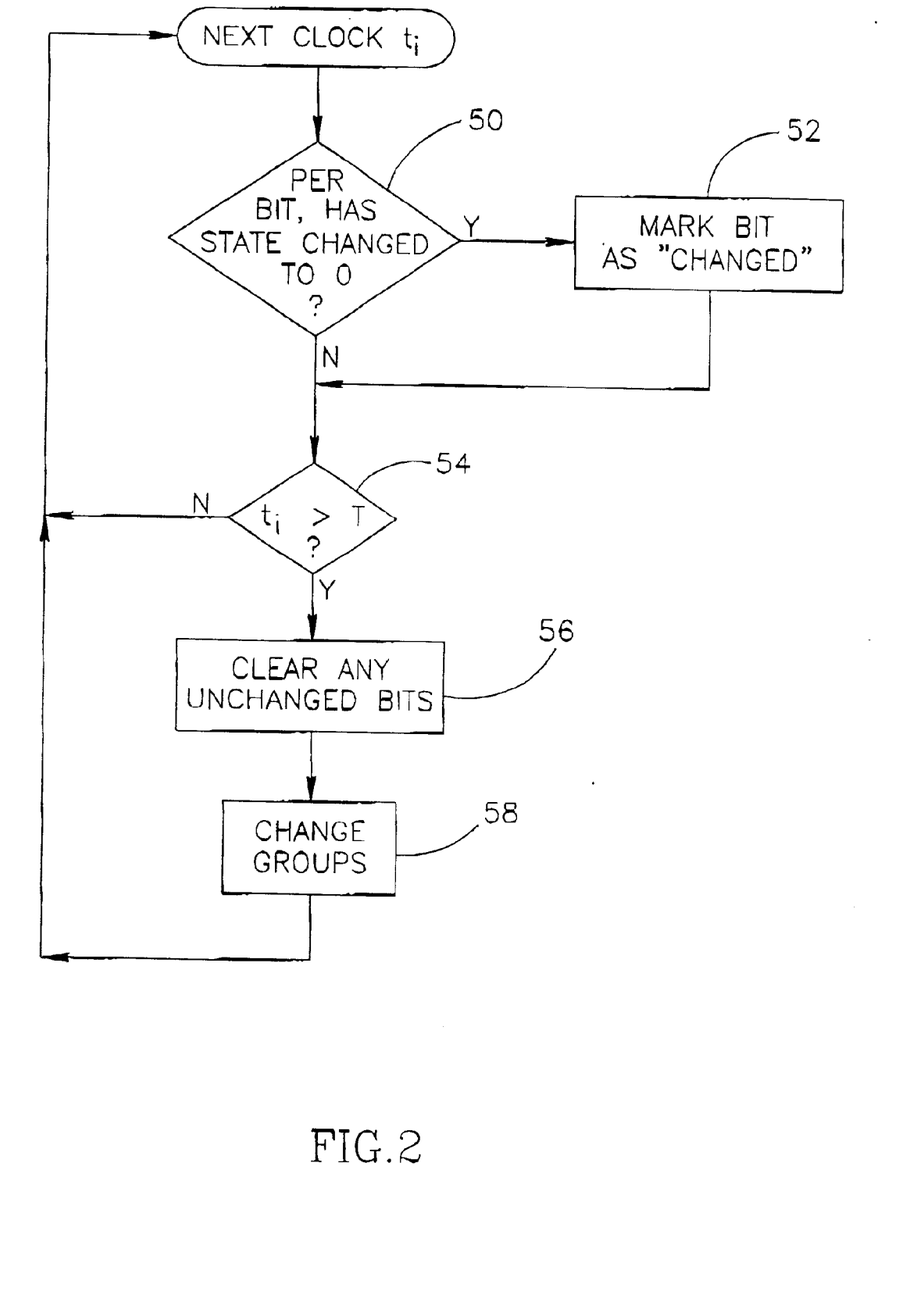
FIG. 2 is a flow chart illustration of a bit clearing mechanism forming part of the memory management apparatus of the present invention.

The operations of the bit clearing mechanism 21 are detailed in FIG. 2. Specifically, at each clock tick $t_i$, the state reviewer 42 checks (step 50) each bit. If the bit has changed to 0, the bit is marked (step 52) as "changed". Otherwise, nothing occurs. The process is repeated until the period T has ended (step 54).

At the end of the period T, the state reviewer 42 clears (step 56) any unchanged bits and the multiplexer 40 changes (step 58) the group. The process is repeated for the next time period T.

Figure 3:
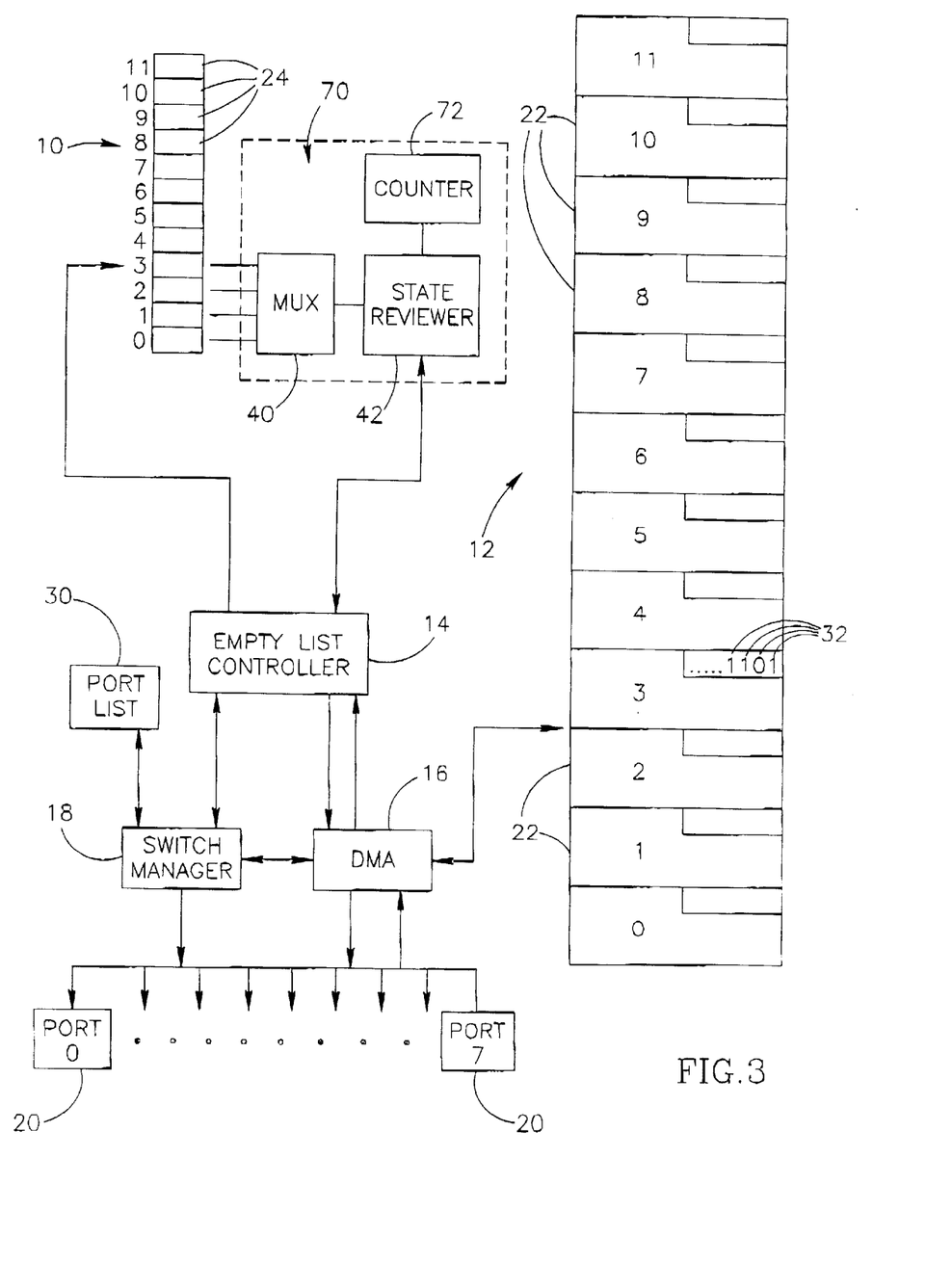
FIG. 3 is a schematic illustration of a memory management apparatus, constructed and operative in accordance with an alternative preferred embodiment of the present invention.

Reference is now made to FIG. 3 which is a schematic illustration of a memory management apparatus, constructed and operative in accordance with an alternative preferred embodiment of the present invention. Similarly referenced numbers refer to similar elements.

The apparatus of FIG. 3 comprises, in addition to the elements described in respect to FIG. 1 hereinabove, a bit clearing mechanism 70. The bit clearing mechanism 70 comprises multiplexer 40, state reviewer 42 and additionally, a counter 72.

Similar to the operations for FIG. 1 hereinabove, the multiplexer 40 connects, at one time, to a group of single bit buffers 24 and switches between groups of buffers every period $T_1$. The state reviewer 42 reviews the state of the group of single bit buffers 24 to determine if all of the single bit buffers 24 in the group changed from 1 to 0 at least once during the period $T_1$. Bit buffers 24 which have changed states are marked as changed; bit buffers 24 that have remained in the set state, or unchanged, are not marked.

At the end of period $T_1$, the state reviewer 42 reviews the states of the group of single bit buffers 24, to determine if any of the bit buffers 24 have remained unmarked. The state reviewer 42 determines x, a total sum of unmarked bit buffers 24 in the group, and indicates x to the counter 72, which then increments a running sum $p_1$ of unchanged buffers by +x. If all the bit buffers 24 are marked, than running sum $p_1$ remains unchanged.

When the running sum $p_1$ is greater than a predetermined threshold P of maximum allowed unchanged buffers, the state reviewer 42 clears both the empty list 10 and counter 72, thereby clearing all the bit buffers 24 and resetting the running sum $p_1$ to 0. This has the effect of rebooting the switch.

Multiplexer 40 then connects to the next group of the single bit buffers 24 and repeats the bit determining/clearing process.

Once a cycle all the groups of the single bit buffers 24 in the empty list 10 has been completed, counter 72 resets the running sum $p_1$ to 0, and the cycle is repeated, starting with the first group reviewed.

Figure 4:
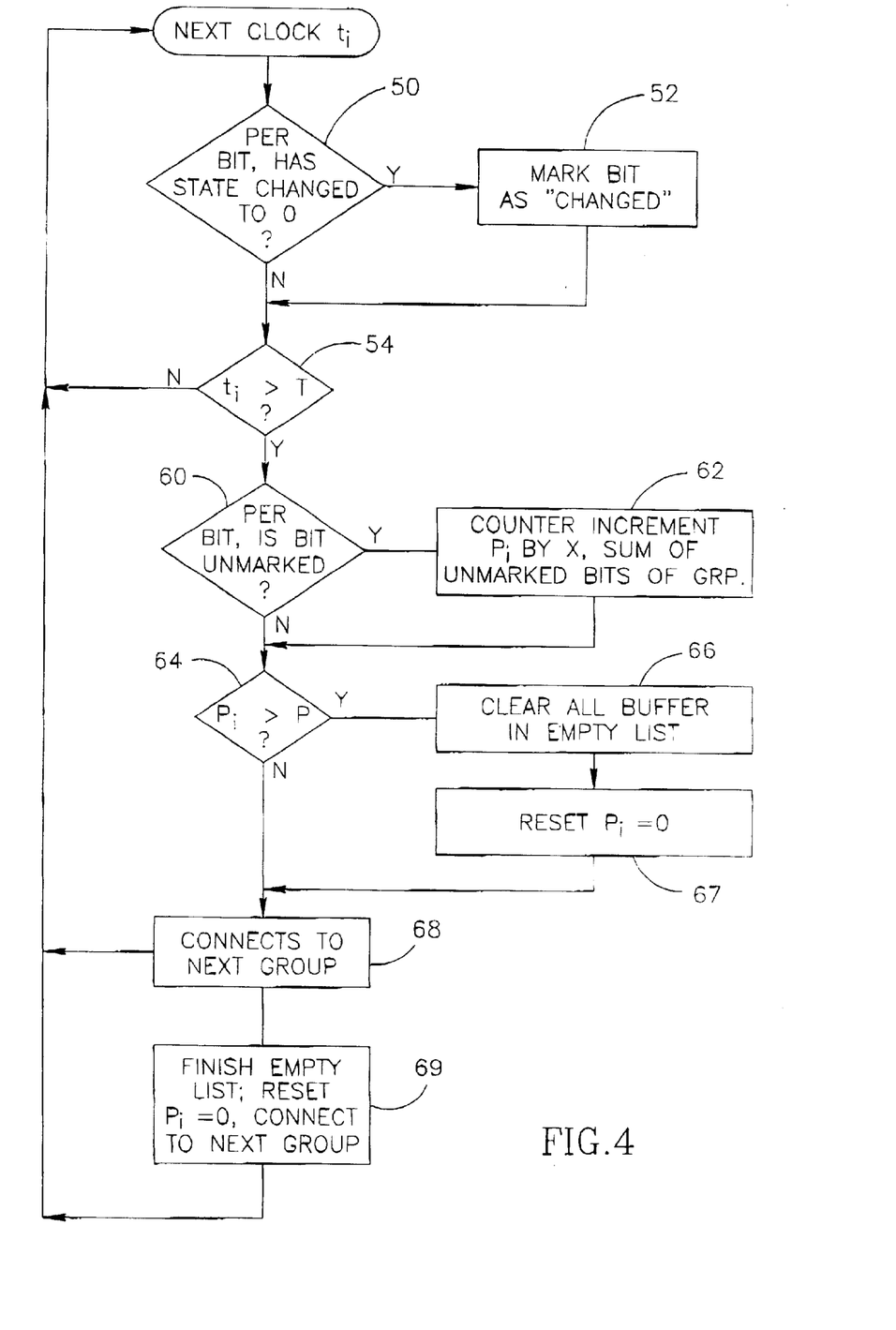
FIG. 4 is a flow chart illustration of an alternative preferred embodiment of a bit clearing mechanism forming part of the memory management apparatus of FIG. 3.

The operations of the bit clearing mechanism 70 are detailed in FIG. 4. Specifically, at each clock tick $t_1$, the state reviewer 42 checks (step 50) each bit. If the bit has changed to 0, the bit is marked (step 52) as "changed". Otherwise, nothing occurs. The process is repeated (step 54) until the period $T_1$ has ended.

At the end of the period $T_1$, the state reviewer 42 determines (step 60) if one bit or more has remained unmarked. Counter 72 increments (step 62) running sum $p_1$ by +x, the total number unmarked buffers in the group. If all the bits have been marked, then $p_1$ remains unchanged. The state reviewer 42 then compares (step 64) running sum $p_1$ to threshold P. When the running sum $p_1$ is larger than threshold P, then the empty list controller 14 clears (step 66) all the bits buffers 24 in the empty list 10, and the counter 72 resets (step 67) running sum $p_1$ to 0.

The multiplexer 40 connects (step 68) to the next group. The process is repeated for the next time period $T_1$.

Once a cycle of all the groups in the empty list has been scanned, the counter 72 resets (step 69) running sum $p_1$ to 0 and the cycle is repeated, starting with the first group reviewed and commencing at the next time period $T_1$.

It will be appreciated be persons skilled in the art that the present invention is not limited to what has been particularly shown and described hereinabove. Rather the scope of the present invention is defined by the claims which follow:

What is claimed is:

1. An apparatus for managing packet memory in a network switch, the apparatus comprising:

an empty list memory comprising a multiplicity of buffers;

wherein each of said multiplicity of buffers is accessible in accordance with a respective list address;

a storage buffer comprising a multiplicity of contiguous buffers;

wherein each of said multiplicity of contiguous buffers is accessible in accordance with a respective buffer address;

wherein each of said multiplicity of buffers corresponds to a respective one of said multiplicity of contiguous buffers and data stored in said multiplicity of buffers indicate if the respective ones of said contiguous buffers have valid data stored therein;

wherein one list address indicates the next available one of said multiplicity of buffers; and a store circuit to store data in the next available one of said multiplicity of contiguous buffers;

wherein a buffer address of the next available one of said multiplicity of contiguous buffers is a function of the one list address of the next available one of said multiplicity of buffers.

2. An apparatus according to claim 1, wherein each of said multiplicity of contiguous buffers stores at least a packet of data.

3. An apparatus according to claim 1, further comprising at least one output port, wherein each of said multiplicity of contiguous buffers also stores multicast bits which indicate one of said output ports for transmitting data stored in said multiplicity of contiguous buffers.

4. An apparatus according to claim 1, further comprising:
a bit clearing unit to clear data stored in a group of said multiplicity of buffers if any one data is stored in one buffer of the group of said multiplicity of buffers for more than a predetermined time.

5. An apparatus according to claim 1, further comprising:
a bit clearing unit to clear data stored in a group of said multiplicity of buffers if data is stored in a predetermined number of buffers of the group of said multiplicity of buffers for more than a predetermined time.

6. A method for managing packet memory in a network switch, the method comprising the steps of:

(a) associating an empty list memory having a multiplicity of buffers with a storage buffer having a multiplicity of contiguous buffers, data being stored in said multiplicity of buffers indicating if the respective ones of said contiguous buffers have valid data stored therein (b) determining an address of the next available one of the multiplicity of single bit buffers;

(c) determining an address of the next available one of the multiplicity of contiguous buffers as a function of the address of the next available one of the multiplicity of single bit buffers associated therewith; and (d) storing data in the next available one of the multiplicity of contiguous buffers in accordance with the address determined step (c).

7. A method according to claim 6, further comprising the steps of:

setting a multicast bit in at least one of said contiguous buffers when data is stored therein, wherein each of said set multicast bits indicates an output port through for transmitting the data stored; and upon transmission of said data through the port, resetting the associated multicast bit.

8. A method according to claim 6, further comprising the step of:
(e) determining if any buffers of said multiplicity of single bit buffers remain set for a predetermined length period T; and
(f) resetting any of said multiplicity of single bit buffers determined in step (e).

9. A method according to claim 6, further comprising the step of:
(e) determining if a predetermined number of buffers of a group of said multiplicity of single bit buffers remain set for a predetermined length period T; and
(f) resetting the group of said multiplicity of single bit buffers determined in step (e).

10. An apparatus for managing packet memory means in a network switch, the apparatus comprising:
empty list memory means comprising a multiplicity of buffer means for storing data;
wherein each of said multiplicity of buffer means is accessible in accordance with a respective list address;
storage buffer comprising a multiplicity of contiguous buffer means for storing data;
wherein each of said multiplicity of contiguous buffer means is accessible in accordance with a respective buffer address;
wherein each of said multiplicity of buffer means corresponds to a respective one of said multiplicity of contiguous buffer means and data stored in said multiplicity of buffer means indicate if the respective ones of said contiguous buffer means have valid data stored therein;
wherein one list address indicates the next available one of said multiplicity of buffer means; and
storing means for storing data in the next available one of said multiplicity of contiguous buffer means;
wherein a buffer address of the next available one of said multiplicity of contiguous buffer means is a function of the one list address of the next available one of said multiplicity of buffer means.

11. An apparatus according to claim 10, wherein each of said multiplicity of contiguous buffer means stores at least a packet of data.

12. An apparatus according to claim 10, further comprising at least one output port means, wherein each of said multiplicity of contiguous buffer means also stores multicast bits which indicate one of said output port means for transmitting data stored in said multiplicity of contiguous buffer means.

13. An apparatus according to claim 10, further comprising:
bit clearing means for clearing data stored in a group of said multiplicity of buffer means if any one data is stored in one buffer of the group of said multiplicity of buffer means for more than a predetermined time.

14. An apparatus according to claim 10, further comprising:
bit clearing means for clearing data stored in a group of said multiplicity of buffer means if data is stored in a predetermined number of buffer means of the group of said multiplicity of buffer means for more than a predetermined time.

* * * * *

UNITED STATES PATENT AND TRADEMARK OFFICE
CERTIFICATE OF CORRECTION

PATENT NO.         : 6,678,278 B2
APPLICATION NO. : 09/861649
DATED              : January 13, 2004
INVENTOR(S)        : Medina et al.

It is certified that error appears in the above-identified patent and that said Letters Patent is hereby corrected as shown below:

Column 3, Line 16       Delete "i" after "buffer"
Column 5, Line 43       Delete "$t_1$" and insert --$t_i$--

Signed and Sealed this

Fourth Day of September, 2007

JON W. DUDAS
*Director of the United States Patent and Trademark Office*